United States Patent
Sato et al.

(10) Patent No.: US 7,612,140 B2
(45) Date of Patent: Nov. 3, 2009

(54) TONER, METHOD FOR PRODUCING THE SAME, IMAGE FORMATION METHOD AND IMAGE FORMATION APPARATUS

(75) Inventors: Koichi Sato, Atsugi (JP); Ken Eguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 11/357,015

(22) Filed: Feb. 21, 2006

(65) Prior Publication Data

US 2006/0142470 A1    Jun. 29, 2006

Related U.S. Application Data

(63) Continuation of application No. PCT/JP2004/013870, filed on Sep. 15, 2004.

(51) Int. Cl.
    *B01J 13/00*    (2006.01)
(52) U.S. Cl. .................. 524/557; 524/556; 526/201; 526/202; 526/328; 526/332
(58) Field of Classification Search .................. 524/556
    See application file for complete search history.

(56) References Cited

U.S. PATENT DOCUMENTS

| | | | |
|---|---|---|---|
| 5,198,319 A | 3/1993 | Kato | 430/96 |
| 5,418,102 A | 5/1995 | Kotaki et al. | 430/109.3 |
| 5,571,653 A | 11/1996 | Kasuya et al. | 430/109 |
| 5,849,219 A | 12/1998 | DeLatt et al. | 516/88 |
| 5,858,602 A * | 1/1999 | Yoshimura et al. | 430/135 |
| 7,498,364 B2 * | 3/2009 | Sato et al. | 523/210 |
| 2002/0180854 A1 * | 12/2002 | Sato et al. | 347/96 |
| 2002/0186288 A1 * | 12/2002 | Nakazawa et al. | 347/100 |
| 2003/0232904 A1 * | 12/2003 | Sato et al. | 523/160 |
| 2003/0236343 A1 * | 12/2003 | Sato et al. | 524/539 |
| 2005/0026061 A1 * | 2/2005 | Mikuriya et al. | 430/108.1 |

FOREIGN PATENT DOCUMENTS

| | | |
|---|---|---|
| EP | 0488729 | 6/1992 |
| EP | 1357138 | 10/2003 |
| JP | 10-239898 | 9/1998 |
| JP | 2003-098727 | 4/2003 |
| WO | 95/28213 | 10/1995 |

OTHER PUBLICATIONS

Yue et al. Powder Technology 146 (2004) 32-45.*
Database WPI, Section Ch, Week 1988 13, Derwent Publ. for JP63-038954 (1988).

* cited by examiner

*Primary Examiner*—David Wu
*Assistant Examiner*—Vu Nguyen
(74) *Attorney, Agent, or Firm*—Fitzpatrick, Cella, Harper & Scinto

(57) ABSTRACT

There is provided a toner having favourable development characteristics and favourable stability and a method for production thereof. The toner comprises at least a graft copolymer and a coloring material, wherein the graft copolymer is formed by graft polymerization of a polymerizable monomer with a block copolymer having a polymerizable functional group on a side chain. The method for producing the toner has a step of subjecting a reaction mixture comprising at least a block copolymer having a polymerizable functional group in a side chain and having a polyalkenyl ether repeating unit structure, a polymerizable monomer, and a coloring material to suspension polymerization or emulsion polymerization, to produce a graft copolymer in which a polymer of the polymerizable monomer is grafted to the side chain of the block copolymer.

5 Claims, 1 Drawing Sheet

TONER, METHOD FOR PRODUCING THE SAME, IMAGE FORMATION METHOD AND IMAGE FORMATION APPARATUS

TECHNICAL FIELD

The present invention relates to a toner that is useful as a recording material for various machines, a method for producing the toner, and an image formation method and image formation apparatus that use the toner.

BACKGROUND ART

Developments in digital printing technology have been progressing at an extraordinary pace in recent years. Digital printing technology is typified by so-called "electrophotographic technology" and "ink jet technology", and digital printing technology in the form of image formation technology has constituted a growing presence in the office and home in recent times.

Recent years have seen rapid developments in colorization and speed-enhancement in the area of electrophotographic technology, stemming from user-driven demand for faster and more beautiful printing. Accompanying these developments, enhanced technical advantages are being sought from toners that serve as the recording material, and in latter years most kinds of color toners have been changed to polymerized toners in an effort to provide more accurate control. As a polymerized toner for providing enhanced technical advantages, Japanese Patent Application Laid-Open No. 2000-089507 discloses a toner in which three kinds of specific external additives are attached to the surface of the toner. However, a good deal of room still remains for enhancing the performance of toners, and further improvement is required.

DISCLOSURE OF THE INVENTION

The present invention was made in view of the circumstances concerning the background art as described above. It is an object of the present invention to provide a toner having favourable development characteristics and favourable stability that contains graft copolymer components in which polymerizable monomers are graft polymerized to a block copolymer comprising a polyalkenyl ether repeating unit structure.

It is another object of the present invention to provide a method for easily producing the aforementioned toner having favourable development characteristics and favourable stability.

It is a further object of the present invention to provide an image formation method and image formation apparatus that use the aforementioned toner.

A first invention of this invention is a toner characterized in that the toner comprises at least a graft copolymer and a coloring material, wherein the graft copolymer is formed by graft polymerization of a polymerizable monomer with a block copolymer having a polymerizable functional group on a side chain.

A second invention of this invention is a method for producing toner, characterized in that the method comprises a step of subjecting a reaction mixture comprising at least a block copolymer having a polymerizable functional group in a side chain, a polymerizable monomer and a coloring material to suspension polymerization or emulsion polymerization, to produce a graft copolymer in which a polymer of the polymerizable monomer is grafted to the side chain of the block copolymer.

A third invention of this invention is a method for forming an image characterized in that the method comprises a step of attaching the aforementioned toner on a medium for recording.

A fourth invention of this invention is an image formation apparatus characterized in that the apparatus has a means for attaching the aforementioned toner on a medium for recording.

A fifth invention of this invention is a polymer compound that is an amphiphilic block polymer having a polymerizable functional group, wherein the compound has a polyalkenyl ether repeating unit structure.

According to the present invention, by the toner comprising graft copolymer components in which polymerizable monomers are graft polymerized to a block copolymer, it is possible to provide a toner having favourable development characteristics and favourable stability.

The present invention can also provide a method for easily producing the aforementioned toner having favourable development characteristics and favourable stability.

Further, the present invention can provide an image formation method and image formation apparatus that use the aforementioned toner.

BEST MODE FOR CARRYING OUT THE INVENTION

Figure 1:
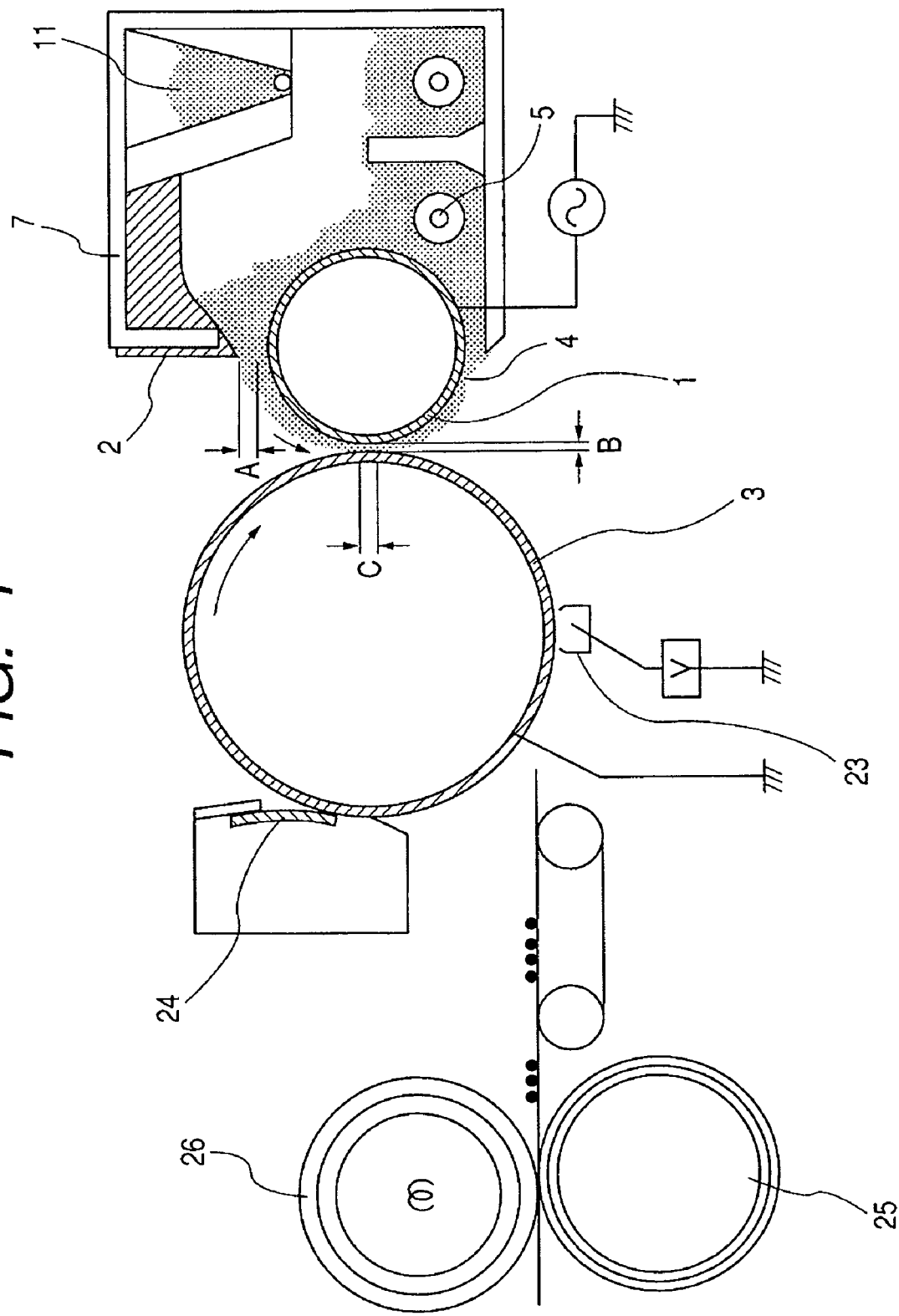
FIG. 1 is a schematic drawing that illustrates one example of the image formation apparatus of the present invention.

The present invention is described in detail hereunder.

As the result of concentrated studies, the present inventors succeeded in completing the present invention.

The first invention of the present invention is a toner characterized in that the toner contains at least a coloring material and a graft copolymer formed by graft polymerization of polymerizable monomers to a block copolymer having a polymerizable functional group in a side chain, preferably a graft copolymer formed by grafting of a polymer of radical polymerizable monomers.

The term "radical polymerizable monomers" refers to monomers having a polymerizable group for polymerizing with a radical, for example, a styrenic, methacrylic or acrylic monomer. These monomers polymerize to form a polymer that binds to a graft copolymer to produce a graft copolymer. In the present invention, a polymerizable monomer that is capable of cationic polymerization or of anionic polymerization may be used.

The term "graft copolymer" refers to a polymer having a different kind of polymer chain as a branch in a side chain of a given polymer chain. For example, polymerizing polymerizable monomers from a polymerizable functional group in a side chain of a given polymer chain to produce a polymer chain is referred to as "graft polymerization", and the thus produced polymer is referred to as a "graft copolymer".

The toner of this invention is preferably a toner containing a block copolymer component comprising a polyalkenyl ether repeating unit structure. The toner of this invention can be obtained in a similar manner to a conventional ground toner by blending and grinding a polymer, a coloring material and a charge control agent, and preferably the toner is produced as a so-called "polymerized toner" by a polymerization technique such as suspension polymerization or emulsion polymerization. Preferred examples of the toner of this invention and a method for producing the toner are described below.

As an example of a method for producing a polymerized toner, a suspension polymerization method described in Japanese Patent Application Laid-Open No. S59-061842 may be mentioned, and the toner of this invention can typically be produced utilizing a method of this kind.

Examples of a polymerizable monomer that may be used herein include styrenic monomers such as styrene, methyl styrene, methoxy styrene and ethyl styrene; acrylic esters such as methyl acrylate, ethyl acrylate, ethyl acrylate, butyl acrylate, propyl acrylate, pentyl acrylate, hexyl acrylate, heptyl acrylate, octyl acrylate, nonyl acrylate, decyl acrylate, dodecyl acrylate, stearyl acrylate and phenyl acrylate; methacrylic esters such as methyl methacrylate, ethyl methacrylate, ethyl methacrylate, butyl methacrylate, propyl methacrylate, pentyl methacrylate, hexyl methacrylate, heptyl methacrylate, octyl methacrylate, nonyl methacrylate, decyl methacrylate, dodecyl methacrylate, stearyl methacrylate and phenyl methacrylate; acrylics such as acrylic acid, methacrylic acid, acrylonitrile, methacrylonitrile and acrylamide; and methacrylic monomers. Further examples include carboxylic acid vinyl ester and the like. These may be used independently or a plurality of the monomers may be mixed and used.

In this invention, block copolymer components that are essential components herein can be preferably used in the following form in the aforementioned suspension polymerization step or emulsion polymerization step. A block copolymer is used in an amphiphilic form comprising a polymerizable functional group. Typical examples of a polymerizable functional group belonging to a side chain of a block copolymer include an acrylic or methacrylic polymerizable functional group. As a specific example of an acrylic or methacrylic polymerizable functional group, a group in which a monomer such as acrylic ester or methacrylate ester is bound to a side chain of a block copolymer may be mentioned.

Preferably a block copolymer has a carboxylic acid or a sulfonic acid or an anionic salt thereof as a site therein. In particular, use of an amphiphilic block copolymer is preferred since formation of a high polymer micelle is facilitated, and toner having a uniform particle size can thus be produced when producing the polymerized toner of this invention.

The term "amphiphilic" refers to the characteristic of having a combination of both lyophilic and lyophobic properties, and typically refers to the case of having a combination of both hydrophilic and hydrophobic properties when a medium is an aqueous solution. As an example of a hydrophilic polymer repeating unit, the structure shown by general formula (1) may be mentioned, and as an example of a hydrophobic polymer repeating unit, the structure shown by general formula (2) may be mentioned.

The content of a polymerizable functional group belonging to a side chain of a block copolymer according to this invention is 0.0001 to 50 mol % with respect to the entire block copolymer, and preferably 0.01 to 20 mol %.

Preferably, these are included as polymerizable functional groups in any segment, and form an integral polymer with the aforementioned polymerizable monomers during a suspension polymerization process or an emulsion polymerization process. Using this method, it is possible to produce toner that contains a graft copolymer (polymer) in which a polymer produced by polymerization of styrenic, methacrylic or acrylic monomers is grafted to the side chain of a block copolymer.

When the aforementioned graft copolymer is used in this form, the toner of this invention can be generated from a suspension polymerization process or emulsion polymerization process in the state of a stable suspension or emulsion, thus enabling the toner particles formed thereby to be produced stably and in a more uniform particle size.

As can be understood from the example described above, a block copolymer component of the present invention need only have a block copolymer structure, and a block copolymer may be bound to another polymer chain, and for this reason the term "block copolymer component" is used herein.

As a block copolymer of this invention, a substance having a polyalkenyl ether repeating unit structure is preferably used, and as a more specific example the repeating unit represented by the following general formula (1) may be mentioned.

General Formula (1)

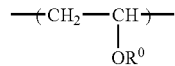

wherein $R^0$ represents $—X—(COO-M)_r$ or $—X—SO_3-M$. $X$ represents a linear, branched, or cyclic alkylene group having 1 to 20 carbon atoms, or $—(CH(R^5)—CH(R^6)—O)_p—(CH_2)_m—CH_{3-r}—$ or $—(CH_2)_m—(O)_n—(CH_2)_q—CH_{3-r}—$, or a structure in which at least one methylene group of these is substituted by a carbonyl group, oxygen atom or aromatic ring structure. r represents 1 or 2. p represents an integer from 1 to 18. m represents an integer from 0 to 35. n represents 1 or 0. q represents an integer from 0 to 17. M represents a hydrogen atom or a monovalent or multivalent cation. $R^5$ and $R^6$ represent a hydrogen atom or an alkyl group, and $R^5$ and $R^6$ may be the same or different from each other.

M represents a hydrogen atom or a monovalent or multivalent metal cation. Specific examples of M include lithium, sodium, potassium and cesium as monovalent metal cations, and magnesium, calcium, nickel and iron as multivalent metal cations. When M is a multivalent metal cation, M forms counter ions with two or more anions.

As an example of the repeating unit structure represented by the above general formula (1), the structure shown below may be mentioned.

The structure of only a $—OR^0$ group of a side chain binding to $—(CH_2—CH)—$ of the repeating unit structure represented by general formula (1) is shown below.

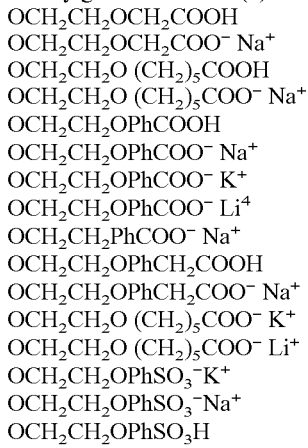

(Ph represents a phenylene group.)

As an example of another polyalkenyl ether repeating unit structure, a structure selected from the group consisting of repeating unit structures represented by the following general formula (2) may be mentioned.

General Formula (2)

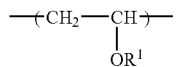

wherein $R^1$ is selected from the group consisting of a linear, branched or cyclic alkyl group having 1 to 18 carbon atoms, -Ph, -Pyr, -Ph-Ph, -Ph-Pyr, $-(CH(R^5)-CH(R^6)-O)_p-R^7$ and $-(CH_2)_m-(O)_n-R^7$, where a hydrogen atom in an aromatic ring may be substituted by a linear or branched alkyl group having 1 to 4 carbon atoms, and a carbon atom in an aromatic ring may be substituted by a nitrogen atom.

p is an integer from 1 to 18, m is an integer from 1 to 36 and n is 0 or 1.

$R^5$ and $R^6$ are each independently a hydrogen atom or $-CH_3$. $R^7$ comprises a substance selected from the group consisting of a hydrogen atom, a linear, branched or cyclic alkyl group having 1 to 18 carbon atoms, -Ph, -Pyr, -Ph-Ph, -Ph-Pyr, $-CHO$, $-CH_2CHO$, $-CO-CH=CH_2$, $-CO-C(CH_3)=CH_2$ or $-CH_2COOR^8$, provided that when $R^7$ is other than a hydrogen atom, a hydrogen atom binding to a carbon atom in $R^7$ can be substituted by a linear or branched alkyl group having 1 to 4 carbon atoms, $-F$, $-Cl$, or $-Br$, and a carbon atom in an aromatic ring can be substituted by a nitrogen atom. $R^8$ is a hydrogen atom or an alkyl group having 1 to 5 carbon atoms. Ph represents a phenyl group and Pyr represents a pyridyl group.

As an example of the repeating unit structure represented by the above general formula (2), the structure shown below may be mentioned.

The structure of only a $-OR^1$ group of a side chain binding to $-(CH_2-CH)-$ of the repeating unit structure represented by general formula (2) is shown below.

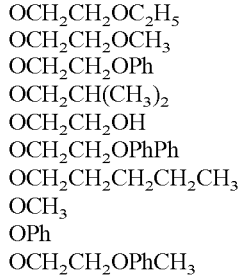

(Ph represents a phenylene or phenyl group.)

Further, as a specific example of a polyalkenyl ether repeating unit structure having a polymerizable functional group in a side chain that is included in a block copolymer of the present invention, the structure shown below may be mentioned. In this case also, only the structure of a side chain part that binds to a main chain is shown below. For the main chain, the above described polyalkenyl ether main chain is preferably used.

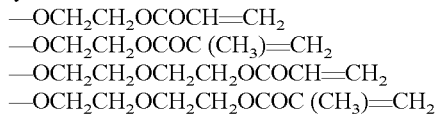

The content of a repeating unit represented by general formula (1) that is contained in a block copolymer preferably used in this invention is preferably 1 mol % or more and 99 mol % or less, and more preferably 5 mol % or more and 80 mol % or less, and the content of a repeating unit represented by general formula (2) is preferably 1 mol % or more and 99 mol % or less, and more preferably 5 mol % or more and 80 mol % or less.

Polymerization of a block copolymer having a polyalkenyl ether repeating unit structure preferably used in this invention is principally conducted by cationic polymerization. Further, among polyalkenyl ethers, polyvinyl ether is preferably used. Examples of an initiator include protonic acids such as hydrochloric acid, sulfuric acid, methanesulfonic acid, trifluoroacetic acid, trifluoromethanesulfonic acid and perchloric acid, and a combination of a Lewis acid such as $BF_3$, $AlCl_3$, $TiCl_4$, $SnCl_4$, $FeCl_3$, $RAlCl_2$, $R_{1.5}AlCl_{1.5}$ (R represents alkyl) and a cation source (cation source, such as protonic acids, water, alcohols, vinyl ethers or carboxylic acids, is combined to form an adduct). Allowing these initiators to coexist with a polymerizable compound (monomer) causes a polymerization reaction to proceed to enable synthesis of a block copolymer. A block copolymer comprising a polyvinyl ether repeating unit structure preferably used in this invention more preferably comprises a polyvinyl ether repeating unit structure of 70 mol % or more. Further preferably, the content is 90 mol % or more, and a case where a block copolymer comprises polyvinyl ether other than in an initiation terminal and polymerization terminal is a typically preferable example.

A polymerization method that is further preferably used in the present invention is described below. While many methods of synthesizing a polymer containing a polyvinyl ether structure have been reported (Japanese Patent Application Laid-Open No. H11-080221), a typical method is the method reported by Aoshima et al. that uses cationic living polymerization (Polymer Bulletin, 15, 417 (1986); Japanese Patent Application Laid-Open No. H11-322942; Japanese Patent Application Laid-Open No. H11-322866). By conducting polymer synthesis using cationic living polymerization, it is possible to synthesize a copolymer comprising a homopolymer and monomers of two or more components, as well as various polymers such as a block copolymer, graft polymer, graduation polymer or the like with their lengths (molecular weights) precisely aligned. It is also possible to perform living polymerization with a $HI/I_2$ system, $HCl/SnCl_4$ system or the like.

The number-average molecular weight (Mn) of block copolymer components of the present invention ranges from 200 to 10,000,000, and a preferably used range is from 1,000 to 1,000,000. When the number-average molecular weight is between 200 and 10,000,000, there is little entanglement within and among polymer chains and they are easily dispersed in a solvent, and thus a steric effect as a polymer can be obtained. A preferable degree of polymerization of each block segment is from 3 to 10,000, more preferably from 5 to 5,000, and further preferably from 10 to 4,000.

The molecular weight dispersion, i.e. Mw/Mn (weight-average molecular weight/number-average molecular weight; these can be respectively measured by, for example, gel permeation chromatography), is preferably 1.6 or less, more preferably 1.4 or less, further preferably 1.3 or less, and most preferably 1.2 or less. The smaller the molecular weight dispersion, the easier it is to realize uniform toner granulation or stable dispersion in a suspension polymerization or emulsion polymerization process.

In terms of obtaining a favorable level of homogeneous dispersibility in a polymerization process, the molecular mobility of a block copolymer is preferably active, and a glass transition temperature Tg of a main chain thereof is preferably 20° C. or below, more preferably 0° C. or below, and further preferably −20° C. or below. In this respect also, a polymer having a polyvinyl ether structure is highly preferable as it generally has a low glass transition temperature and flexible characteristics. In the case of the examples of repeating unit structures described above, the glass transition temperature in most cases is 0°C. or below.

The aforementioned block copolymer components used in the present invention are present in a toner within a range of 0.001% by weight to 95% by weight, preferably 0.01% by weight to 90% by weight, and more preferably 0.1% by weight to 80% by weight. When the block copolymer components are present in a toner within the range of 0.001% by weight to 95% by weight, favourable dispersion stability as well as favourable toner stability can be obtained.

The amount of polymerizable monomers to be graft polymerized to the aforementioned block copolymer used in this invention that is present in a toner is within a range of 0.1% by weight to 95% by weight. Preferably, the amount is within a range of 1% by weight to 90% by weight.

The number-average molecular weight (Mn) of graft copolymer components of this invention is within a range of 1,000 to 10,000,000, and a range of 3,000 to 1,000,000 is preferably used. When the number-average molecular weight is within the range of 1,000 to 10,000,000, favourable dispersion stability as well as favourable toner stability can be obtained.

The aforementioned graft copolymer components used in the present invention are present in toner within a range of 1% by weight to 99% by weight, preferably a range of 10% by weight to 95% by weight, and more preferably a range of 20% by weight to 92% by weight. When the graft copolymer components are present in toner within the range of 1% by weight to 99% by weight, favourable dispersion stability as well as favourable toner stability can be obtained.

Other components that can be used in the aforementioned suspension polymerization or emulsion polymerization process are described below.

In addition to block copolymer components, surfactants and other polymers may be used as a dispersant.

As a polymerization initiator, an azo-based polymerization initiator such as azobisisobutyronitrile or azobisdimethylvaleronitrile, or a peroxide-based initiator such as benzoyl peroxide, cumene hydroperoxide, tert-butyl hydroperoxide, hydrogen peroxide or potassium persulfate can be used. Preferably, an added amount of a polymerization initiator is from 0.5 to 20 parts by weight based on 100 parts by weight of polymerizable monomers, and the initiators may be used independently or may be mixed for use. A known crosslinker or chain transfer agent may also be added in order to regulate a polymer molecule amount in a polymerized toner.

The invention preferably contains a wax as a releasing agent. Examples of a wax that may be used herein include a paraffin or polyolefin wax and a modification product thereof, as well as a polyfunctional polyester or the like. A wax is present in an amount of 1 to 40 parts by weight based on 100 parts by weight of polymerizable monomers, and an amount of 5 to 35 parts by weight is preferred.

A charge control agent is also preferably used. Examples thereof include an organometallic compound, aromatic hydroxycarboxylic acid, urea derivative, S quaternary ammonium salt, nigrosine and its modification products modified by a fatty acid metal salt or the like, and dibutyltin oxide. These charge control agents are preferably used in an amount within the range of 0.01 to 20 parts by weight based on 100 parts by weight of resinous principle.

As a coloring material, a pigment or dye can be used, and as examples thereof the following substances may be mentioned. Examples of a black pigment include, but are not limited to, Raven 1060 (product name, manufactured by Columbian Carbon Co.), MOGUL-L (product name, manufactured by Cabot Corp.), Color Black FW1 (product name, manufactured by Degussa) and MA 100 (product name, manufactured by Mitsubishi Chemical Corporation).

Examples of a cyan pigment include, but are not limited to, CI Pigment Blue-15:3, CI Pigment Blue-15:4 and CI Pigment Blue-16.

Examples of a magenta pigment include, but are not limited to, CI Pigment Red-122, CI Pigment Red-123 and CI Pigment Red-146.

Examples of a yellow pigment include, but are not limited to, CI Pigment Yellow-74, CI Pigment Yellow -128 and CI Pigment Yellow -129.

Examples of a water soluble dye include direct dyes such as CI Direct Black -17, -62 and -154, CI Direct Yellow -12, -87 and -142, CI Direct Red -1, -62 and -243, CI Direct Blue -6, -78 and -199, CI Direct Orange -34 and -60, CI Direct Violet -47 and -48, CI Direct Brown -109, and CI Direct Green -59; acid dyes such as CI Acid Black -2, -52 and -208, CI Acid Yellow -11, -29 and -71, CI Acid Red -1, -52 and -317, CI Acid Blue -9, -93 and -254, CI Acid Orange -7 and -19, and CI Acid Violet -49; reactive dyes such as CI Reactive Black -1, -23 and -39, CI Reactive Yellow -2, -77 and -163, CI Reactive Red -3, -111 and -221, CI Reactive Blue -2, -101 and -217, CI Reactive Orange -5, -74 and -99, CI Reactive Violet -1, -24 and -38, CI Reactive Green -5, -15 and -23, and CI Reactive Brown -2, -18 and -33; and CI Basic Black -2, CI Basic Red -1, -12 and -27, CI Basic Blue -1 and -24, CI Basic Violet -7, -14 and -27, and CI Food Black -1 and -2.

Further, as examples of an oil-soluble dye, the commercially available items listed below may be mentioned.

Examples of a black oil-soluble dye include, but are not limited to, CI Solvent Black -3, -22:1 and -50.

Examples of a yellow oil-soluble dye include, but are not limited to, CI Solvent Yellow -1, -25:1 and -172.

Examples of an orange oil-soluble dye include, but are not limited to, CI Solvent Orange -1, -40:1 and -99.

Examples of a red oil-soluble dye include, but are not limited to, CI Solvent Red -1, -111 and -229.

Examples of a violet oil-soluble dye include, but are not limited to, CI Solvent Violet -2, -11 and -47.

Examples of a blue oil-soluble dye include, but are not limited to, CI Solvent Blue -2, -43 and -134.

Examples of a green oil-soluble dye include, but are not limited to, CI Solvent Green -1, -20 and -33.

Examples of a brown oil-soluble dye include, but are not limited to, CI Solvent Brown -1, -12 and -58.

The above-described coloring materials are preferably used in an amount within a range of 0.1 to 20 parts by weight based on 100 parts by weight of resin, and are more preferably used within a range of 0.2 to 10 parts by weight.

The toner of this invention can also be used as a magnetic toner, and at such time a magnetic material is contained therein. Examples of a magnetic material include iron oxide such as magnetite, ferrite and hematite, and metals such as iron, cobalt and nickel.

The shape of a polymerized toner according to a polymerization method described above can be made spherical, and a spherical shape is preferred.

The average particle diameter of the toner of this invention is preferably from 0.1 µm to 20 µm, and more preferably from 1 µm to 10 µm.

Although the toner of the present invention is preferably used as a dry toner, it can also be advantageously used as a wet toner. A wet toner can be obtained, for example, by isolating particles that are produced by suspension polymerization, drying the particles, and then dispersing the particles in a solvent for a wet toner, such as isopar. Although a hydrocarbon solvent such as isopar is preferably used as a dispersion solvent, the use of other solvents is not excluded herein. When using the toner of the invention as a wet toner, in addition to particles and a solvent, as described above or newly, a dispersing auxiliary agent such as a polymer, surfactant or metallic soap, and an additive such as a charged material may be used.

The second invention of the present invention is a method for producing the aforementioned toner through a process of subjecting reaction components containing at least a block copolymer having a polymerizable functional group in a side chain, a polymerizable monomer and a coloring material to suspension polymerization or emulsion polymerization, to produce a graft copolymer in which a polymer of polymerizable monomers is grafted to a side chain of the block copolymer.

In this invention, the use of a block copolymer comprising a polyalkenyl ether repeating unit structure is preferable for the reasons described above.

A specific method is explained hereafter as an example. To the aforementioned polymerizable monomer are added a wax, a block copolymer component having a polyalkenyl ether repeating unit structure, a coloring material, a charge control agent, a polymerization initiator and other additives. The mixture is then uniformly dissolved and dispersed using a homogenizer or the like, and the resulting mixture is spread in an aqueous phase and uniformly suspended or emulsified using a stirrer or homogenizer or the like.

Preferably, polymerization is conducted at a weight ratio of 300 to 10,000 parts by weight of water to 100 parts by weight of monomeric component system. Polymerization is conducted at a temperature at which a polymerization initiator functions, to thus conduct toner granulation. At this time, since a block copolymer having a polymerizable functional group in a side chain and having a polyalkenyl ether repeating unit structure is preferably used in this invention, a more uniform toner granulation can be carried out. In order to carry out granulation of granules having a uniform diameter, a molecular weight dispersion Mw/Mn of a block copolymer having a polyalkenyl ether repeating unit structure is preferably 1.8 or less, further preferably 1.6 or less, and more preferably 1.4 or less or 1.3 or less.

After polymerizing the toner of the present invention in this manner, an external additive can be used. Both inorganic microparticles and organic microparticles may be used. Examples thereof include silicon dioxide, aluminium oxide, titanium oxide, tin oxide, barium titanate, methacrylate ester polymer microparticles, fluorocarbon and fluorine resin powder.

Next, an image formation method and apparatus that use the toner of this invention will be described as the third and fourth inventions of the present invention.

The image formation method of this invention requires the toner of this invention, and is typically an image formation method according to an electrophotographic method or electrophoresis method. The image formation method of the present invention may be an image recording method or an image display method. Examples of an image recording method and apparatus typically include an electrophotographic photocopier and laser printer.

FIG. 1 is a schematic drawing that illustrates one example of an image formation apparatus of this invention. Reference numeral 1 denotes a developer sleeve, and reference numeral 3 denotes a photosensitive drum. In FIG. 1, a developer may comprise either a two-component system of a carrier and toner or a one-component system of only a toner. A distance B between the developer sleeve and the photosensitive drum is preferably within the range of 10 μm to 1,000 μm, and must be a distance whereby an appropriate developer concentration is obtained. In FIG. 1, an alternating current electric field is used between the photosensitive drum 3 and the developer sleeve 1. A peak-to-peak voltage is preferably from 300 V to 7,000 V, and a frequency is preferably from 300 Hz to 30,000 Hz. The size of a development nip C is preferably 1 mm to 20 mm. Further, A is preferably 0.01 mm to 30 mm. After development using the development nip, toner is transferred to receiver paper in a zone of a corona electrode for image transfer 23, and then fixed with fixing rollers 25 and 26 to complete the recording.

The fifth invention of the present invention is a polymer compound that is an amphiphilic block polymer having a polymerizable functional group, wherein the compound has a polyalkenyl ether repeating unit structure. The details thereof are described above, and preferably the compound has at least two block segments, and a further preferable example is a compound having three or more block segments. The compound of this invention is typically used in the aforementioned first to fourth inventions, and therefore a polymerizable functional group is preferably contained in a hydrophobic segment. Use of the compound of this invention is not limited to use in the aforementioned first to fourth inventions.

EXAMPLE 1

The present invention is explained in detail hereunder by means of examples, although the present invention is not limited to the following examples.

<Synthesis of Block Polymer>

Synthesis of a block polymer comprising isobutyl vinyl ether (IBVE), ethylene glycol monovinyl ether methacrylate (A block) and diethylene glycol vinyl methyl ether (B block).

The atmosphere in a glass container fitted with a three way stopcock was replaced by nitrogen, and then the container was heated to 250° C. under a nitrogen gas atmosphere to remove absorbed water. After returning the system to room temperature, 12 mmol (millimole) of IBVE, 1 mmol of ethylene glycol monovinyl ether methacrylate, 16 mmol of ethyl acetate, 0.05 mmol of 1-isobutoxyethyl acetate and 11 ml of toluene were added thereto, and the reaction system was cooled. When the temperature inside the system reached 0° C., 0.2 mmol of ethyl aluminum sesquichloride (equimolar mixture of diethyl aluminum chloride and ethyl aluminum dichloride) was added thereto to initiate polymerization. Molecular weight was monitored in a time division manner using molecular sieving column chromatography (GPC), and completion of polymerization of A block was verified.

Next, 12 mmol of monomer of B block was added thereto to continue polymerization. The polymerization reaction was terminated after 20 h. Termination of the polymerization reaction was conducted by adding 0.3% by weight of ammonia/methanol solution to the system. The reaction mixture solution was diluted with dichloromethane, washed 3 times with 0.6 M hydrochloric acid, followed by washing 3 times with distilled water. The obtained organic phase was condensed and dried with an evaporator, and the resulting product was vacuum dried to obtain an amphiphilic diblock polymer. Identification of the compound was conducted using NMR and GPC. The number-average molecular weight Mn was 42,500, and molecular weight dispersion Mw/Mn (weight-average molecular weight/number-average molecular weight) was 1.26. The polymerization ratio was A:B=105:100.

<Synthesis of Toner>

510 parts by weight of 0.1 M $Na_3PO_4$ aqueous solution was mixed in 700 parts by weight of ion exchanged water, the mixture was heated to 60° C., stirred at 12,000 rpm using a TK-type homomixer (manufactured by Tokushu Kika Kogyo Co. Ltd.), and then 75 parts by weight of 1.0 M $CaCl_2$ aqueous solution was added thereto and stirring continued. To this mixture was added a mixture containing 160 parts by weight of styrene, 8 parts by weight of copper phthalocyanine pigment, 40 parts by weight of butyl acrylate, 12 parts by weight of previously synthesized block polymer, 5 parts by weight of aluminum di-t-butylsalicylate, 0.2 parts by weight of di-t-butylsalicylate, 45 parts by weight of microcrystalline wax (melting point 45° C.) and 6 parts by weight of azobis (2,4-dimethylvaleronitrile). The resulting mixture was stirred for 25 min at 10,000 rpm at 60° C. to granulate the polymers. While stirring with a paddle mixing impeller, the temperature was increased to 80° C. and the mixture was allowed to react for 10 h. After polymerization, hydrochloric acid was added, and the product was filtered, washed and then dried to obtain polymer granules. 2 parts by weight of hydrophobic titanium oxide particles having a diameter of 0.06 μm were externally added to 100 parts by weight of the obtained particles to obtain polymerized toner particles.

The above particles were measured with a particle size analyzer (manufactured by Microtrac). The results showed the particles had an extremely sharp particle diameter distribution, having an average particle diameter of 6.7 μm, a minimum particle diameter of 3.1 μm and a maximum particle diameter of 12.4 μm. These particles were observed with a laser confocal microscope (manufactured by Keyence Corporation) and it was found that they had a spherical shape.

The above particles were extracted with chloroform, filtered, and components with a number-average molecular weight of 20,000 or more were fractionated using GPC and then measured with NMR. It was found that grafted polymers were produced which have a grafting in the position of polymerizable groups of side chains in the initially used block polymers.

EXAMPLE 2

Toner was synthesized in the same manner as Example 1 using the same kind of monomers as for the block polymers used in Example 1 and the same polymerization ratio, with Mn=34,100 and molecular weight dispersion Mw/Mn=1.31.

These particles were measured with a particle size analyzer (manufactured by Microtrac). The results showed the particles had an extremely sharp particle diameter distribution, having an average particle diameter of 7.7 μm, minimum particle diameter of 3.5 μm and maximum particle diameter of 12.9 μm. These particles were observed with a laser confocal microscope (manufactured by Keyence Corporation), and it was found that they had a spherical shape.

The above particles were extracted with chloroform, filtered, and components with a number-average molecular weight of 20,000 or more were fractionated using GPC and then measured with NMR. It was found that grafted polymers were produced which have a grafting in the position of polymerizable groups of side chains in the initially used block polymers.

EXAMPLE 3

Using the same synthesis method as in Example 1, an ABC triblock polymer was synthesized using isobutyl vinyl ether (IBVE), ethylene glycol monovinyl ether methacrylate (A block), diethylene glycol vinyl methyl ether (B block) and ethyl 4-(2-vinyloxy)ethoxybenzoate (C block). The number-average molecular weight Mn was 46,500 and molecular weight dispersion Mw/Mn (weight-average molecular weight/number-average molecular weight) was 1.28. The polymerization ratio was A:B:C=105:100:14. Carboxylate ester of the C block thereof was subjected to alkaline hydrolysis to synthesize a sodium-salt type triblock polymer.

Toner was synthesized in the same manner as in Example 1, and the particles were measured with a particle size analyzer (manufactured by Microtrac). It was found that the particles had an extremely sharp particle diameter distribution, having an average particle diameter of 7.9 μm, a minimum particle diameter of 3.4 μm and a maximum particle diameter of 14 μm. These particles were observed with a laser confocal microscope (manufactured by Keyence Corporation), and it was found they had a spherical shape. The above particles were extracted with chloroform, filtered, and components with a number-average molecular weight of 20,000 or more were fractionated using GPC and then measured with NMR. It was found that grafted polymers were produced which have a grafting in the position of polymerizable groups of side chains in the initially used block polymers.

EXAMPLE 4

Using the same synthesis method as in Example 1, an AB di/triblock polymer was synthesized using 2-(4-methylphenyloxy) ethyl vinyl ether, ethylene glycol monovinyl ether methacrylate (A block) and 4-(2-vinyloxy) ethoxy-benzenesulfonic acid ethyl (B block). The number-average molecular weight Mn was 23,500 and molecular weight dispersion Mw/Mn (weight-average molecular weight/number-average molecular weight) was 1.41. The polymerization ratio was A:B=105:24. Ester of the B block thereof was subjected to hydrolysis to synthesize a sodium-salt type block polymer.

Toner was synthesized in the same manner as in Example 1, and the particles were measured with a particle size analyzer (Microtrac). It was found that the particles had an extremely sharp particle diameter distribution, having an average particle diameter of 8.3 μm, a minimum particle diameter of 3.4 μm and a maximum particle diameter of 15 μm. These particles were observed with a laser confocal microscope (Keyence Corporation), and it was found they had a spherical shape. The above particles were extracted with chloroform, filtered, and components with a number-average molecular weight of 20,000 or more were fractionated using GPC and then measured with NMR. It was found that grafted polymers were produced which have a grafting in the position of polymerizable groups of side chains in the initially used block polymers.

EXAMPLE 5

95 parts by weight of fluorine-acrylic coat ferrite carrier of an average particle diameter of 50 μm was mixed with 4 parts by weight of the particles produced in Example 1, to produce a toner developer. Using this developer, an A4-size text document was copied onto TKCLA4 laser copy paper (manufactured by Canon Inc.) using a color copier CLC-800 (manufactured by Canon Inc.), whereby a clear print was produced.

EXAMPLE 6

95 parts by weight of fluorine-acrylic coat ferrite carrier of an average particle diameter of 50 μm was mixed with 4 parts by weight of the particles produced in Example 2, to produce a toner developer. Using this developer, an A4-size text document was copied onto TKCLA4 laser copy paper (Canon Inc.) using a color copier CLC-800 (Canon Inc.), whereby a clear print was produced.

Toner was produced in a similar manner as described above using the particles produced in Example 3 and Example 4. Using these toners, an A4-size text document was copied onto TKCLA4 laser copy paper (Canon Inc.) using a color copier CLC-800 (Canon Inc.), whereby clear prints were produced.

COMPARATIVE EXAMPLE 1

Polymerized toner was synthesized in the same manner as in Example 1 with the exception that polyvinyl alcohol of a weight-average molecular weight of 32,000 was used in place of the block polymer in the step of synthesizing polymerized toner. These particles were then measured with a particle size analyzer (Microtrac). The results showed the particles had a wide particle diameter distribution, having an average particle diameter of 10.7 μm, a minimum particle diameter of 0.8 μm and a maximum particle diameter of 120.4 μm.

Fluorine-acrylic coat ferrite carriers of an average particle diameter of 50 μm were mixed with these particles to produce developer in a similar manner to Example 3. Using this developer, an A4-size text document was copied onto TKCLA4 laser copy paper (Canon Inc.) using a color copier CLC-800 (Canon Inc.). The resulting text image was indistinct.

COMPARATIVE EXAMPLE 2

Polymerized toner was synthesized in the same manner as in Example 1 with the exception that a random copolymer of acrylic acid and acrylic methyl of a molar ratio of 40:60 having a weight-average molecular weight of 31,000 was used in place of the block polymer in the step of synthesizing polymerized toner. These particles were then measured with a particle size analyzer (Microtrac). The results showed the particles had a wide particle diameter distribution, having an average particle diameter of 10.7 μm, a minimum particle diameter of 1.8 μm and a maximum particle diameter of 50.4 μm.

EXAMPLE 7

15 parts by weight of the particles produced in Example 3 and 0.3 parts by weight of calcium cetylbenzenesulfonate were mixed in 120 parts by weight of isopar, and following dispersal using a homogenizer, the mixture was filtered using a 20-μm diameter membrane filter to remove coarse particles, to prepare a wet toner. Using this wet toner, a printing test was performed on plain paper using a wet-type electrophotography apparatus (NP70 copier, manufactured by Canon Inc.), whereby characters of favorable quality were printed.

INDUSTRIAL APPLICABILITY

The toner of the present invention preferably contains graft copolymer components in which polymerizable monomers were graft polymerized to block copolymers comprising a polyalkenyl ether repeating unit structure. The toner can thus be used as a dry-type or wet toner that has favourable development characteristics and favourable stability.

The production method of the present invention can be used as a method for easily producing the aforementioned toner having favourable development characteristics and favourable stability.

Further, the aforementioned toner of the present invention can be utilized in an image formation method and image formation apparatus.

This application claims priority from Japanese Patent Application Nos. 2003-328526 filed on Sep. 19, 2003 and 2004-139191 filed on May 7, 2004, which are hereby incorporated by reference herein.

The invention claimed is:

1. A toner, characterized in that the toner comprises at least a graft copolymer and a coloring material,
wherein the graft copolymer is formed by suspension polymerization or emulsion polymerization of a styrenic, methacrylic or acrylic monomer with an amphiphilic block copolymer having a hydrophilic block segment having a repeating unit structure represented by General Formula (1) shown below and a hydrophobic block segment having a repeating unit structure represented by general formula (2) shown below and a repeating unit structure represented by General Formula (3) shown below and has a structure in which a polymer produced by polymerization of styrenic, methacrylic or acrylic monomer is grafted to the side chain of the block copolymer;
wherein the polymerizable functional group that the block copolymer has on the side chain is in a content of 0.0001 to 50 mol % with respect to the entire block copolymer; and
wherein the styrenic, methacrylic or acrylic monomer that is graft polymerized to the block copolymer is in an amount of 0.1% by weight to 95% by weight in the toner;

General Formula (1)

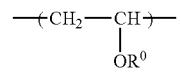

wherein $R^0$ represents $-X-(COO-M)_r$ or $-X-SO_3-M$. X represents a linear, branched, or cyclic alkylene group having 1 to 20 carbon atoms, or $-(CH(R^5)-CH(R^6)-O)_p-(CH_2)_m-CH_{3-r}-$ or $-(CH_2)_m-(O)_n-(CH_2)_q-CH_{3-r}-$, or a structure in which at least one methylene group thereof is substituted by a carbonyl group, oxygen atom or aromatic ring structure; r represents 1 or 2; p represents an integer from 1 to 18; m represents an integer from 0 to 35; n represents 1 or 0; q represents an integer from 0 to 17; M represents a hydrogen atom or a monovalent or multivalent cation; and $R^5$ and $R^6$ represent a hydrogen atom or an alkyl group, and $R^5$ and $R^6$ may be the same or different from each other, General Formula (2)

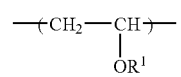

wherein $R^1$ is selected from the group consisting of a linear, branched or cyclic alkyl group having 1 to 18 carbon atoms, -Ph, -Pyr, $-(CH(R^5)-CH(R^6)-O)_p-R^7$ and $-(CH_2)_m-(O)_n-R^7$, where a hydrogen atom in an aromatic ring may be substituted by a linear or branched alkyl group having 1 to 4 carbon atoms, and a carbon atom in an aromatic ring may be substituted by a nitrogen atom; p is an integer from 1 to 18; m is an integer from 1 to 36 and n is 0 or 1; $R^5$ and $R^6$ are each independently a hydrogen atom or $-CH_3$; $R^7$ comprises a substance selected from the group consisting of a hydrogen atom, a linear, branched or cyclic alkyl group having 1 to 18 carbon atoms, -Ph, -Pyr, —CHO, —CH$_2$CHO, —CO—CH=CH$_2$, —CO—C(CH$_3$)=CH$_2$ and —CH$_2$COOR$^8$, provided that when R$^7$ is other than a hydrogen atom, a hydrogen atom binding to a carbon atom in R$^7$ can be substituted by a linear or branched alkyl group having 1 to 4 carbon atoms, —F, —Cl, or —Br, and a carbon atom in each aromatic ring can be substituted by a nitrogen atom; R$^8$ is a hydrogen atom and an alkyl group having 1 to 5 carbon atoms; Ph represents a phenyl group and Pyr represents a pyridyl group, General Formula (3)

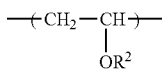

wherein —OR$^2$ is selected from the group consisting of the following formulas:

—OCH$_2$CH$_2$OCOCH=CH$_2$,

—OCH$_2$CH$_2$OCOC(CH$_3$)=CH$_2$,

—OCH$_2$CH$_2$OCH$_2$CH$_2$OCOCH=CH$_2$, or

—OCH$_2$CH$_2$OCH$_2$CH$_2$OCOC(CH3)=CH$_2$.

2. The toner according to any one of claims 1, characterized in that the toner is a wet toner.

3. The toner according to claim 1, characterized in that the toner further contains a wax component.

4. An image formation method characterized in that the method comprises a step of attaching the toner according to claim 1 on a medium for recording.

5. An image formation apparatus characterized in that the apparatus has a means for attaching the toner according to claim 1 on a medium for recording.

* * * * *